March 20, 1934. L. N. POND 1,951,993

TAKE-OFF ROLL FOR GLASS TUBING AND CANE

Filed Nov. 8, 1932

Inventor

LEANDER N. POND

By Dorsey & Cole

Attorney

Patented Mar. 20, 1934

1,951,993

UNITED STATES PATENT OFFICE 1,951,993

TAKE-OFF ROLL FOR GLASS TUBING AND CANE

Leander N. Pond, Corning, N. Y., assignor to N. V. Maatschappij tot Beheer en Exploitatie van Octrooien, The Hague, Netherlands Application November 8, 1932, Serial No. 641,778

1 Claim. (Cl. 49—17.1)

Application, Serial No. 582,860, filed December 23, 1931 by Sanchez-Vello described grooved rollers for take-off glass tubing and cane from a forming machine. The rollers in such application are skewed; i. e., have their plane of rotation inclined to the vertical plane of the axis of the tubing or cane for giving a rotation to the tubing or cane around such axis.

I have discovered that this rotation may be given to the glass tubing or cane, hereinafter called "cylindrical glass", even when the rollers are not skewed, by giving to the walls forming the grooves thereof unequal angles to the axis of the rollers, and it is to protect this invention that this application is filed.

Referring to the accompanying drawing in which corresponding marks are designated by similar marks of reference,—

Figure 1:
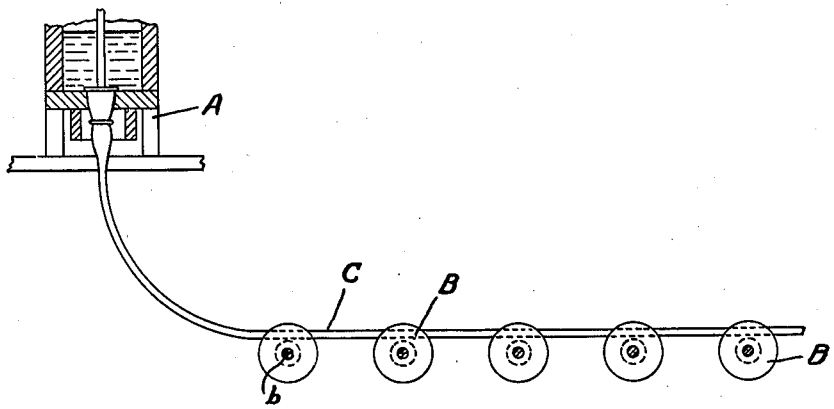
Figure 1 is a diagrammatic view of a structure embodying this invention.
Figure 2:
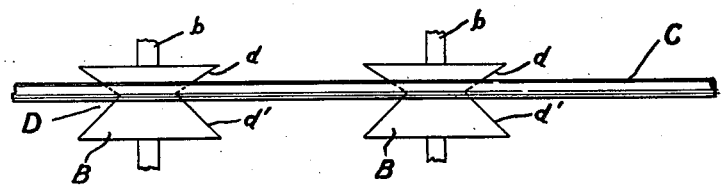
Figure 2 is a fragmental plan view thereof.
Figure 3:
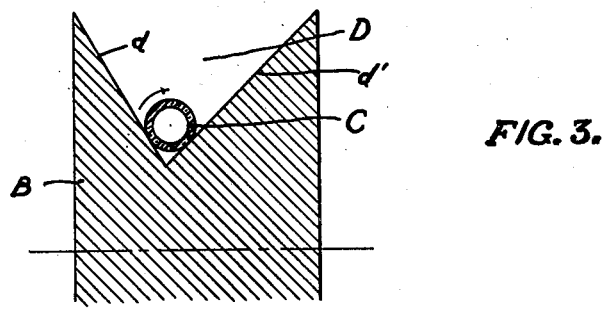
Figure 3 is a fragmental vertical section through a roller embodying my invention.

As shown in Figure 1, the glass tubing or cane issuing vertically from the furnace A is bent and taken away horizontally on a series of rollers B. According to this invention each of the rollers B is mounted with its axis $b$ horizontal and at right angles to the axial line of the cylindrical glass C resting thereon, and has in its periphery a groove D in which the glass rests. The walls $d, d'$ are inclined at unequal angles to the plane of rotation of the roller and to the axis of the roller. Under such conditions the friction between the more acute walls $d$ and the glass tends to turn the latter around its axis (see curved arrow Figure 3) on the rotation of the roller, whether such rotation of the roller be due to the drag exerted thereon by the glass in its axial movement or to the fact that the roller is driven by a suitable motor and causes travel of the glass.

Having thus described my invention what I claim is:—

A take-off roller for cylindrical glass mounted to rotate around a substantially horizontal axis below and at right angles to the line of feed of the glass and having a peripheral groove thereon to receive the glass, the walls on the opposite sides of said glass at the points at which they contact with the glass being differently inclined to the plane of rotation of the roller.

LEANDER N. POND.